(12) United States Patent
Moles

(10) Patent No.: US 6,406,605 B1
(45) Date of Patent: Jun. 18, 2002

(54) ELECTROOSMOTIC FLOW CONTROLLED MICROFLUIDIC DEVICES

(75) Inventor: Donald R. Moles, Cedarville, OH (US)

(73) Assignee: YSI Incorporated, Yellow Springs, OH (US)

( * ) Notice: Subject to any disclaimer, the term of this patent is extended or adjusted under 35 U.S.C. 154(b) by 0 days.

(21) Appl. No.: 09/566,582

(22) Filed: May 8, 2000

Related U.S. Application Data

(60) Provisional application No. 60/136,886, filed on Jun. 1, 1999.

(51) Int. Cl.[7] .............................. B81B 3/00; B81B 5/00; B81B 7/04; B81B 7/02
(52) U.S. Cl. ..................... 204/601; 204/600; 204/451; 204/452; 204/454; 422/100; 422/99; 422/103; 251/129.06; 251/66.1; 137/833
(58) Field of Search ................................ 204/451, 452, 204/454, 600, 601; 422/100, 99; 251/129.04, 129.06, 66.1; 137/833, 825

(56) References Cited

U.S. PATENT DOCUMENTS

| | | | |
|---|---|---|---|
| 3,893,904 A | 7/1975 | Hadermann et al. | 204/627 |
| 3,923,426 A | 12/1975 | Theeuwes | 204/630 |
| 4,304,257 A | 12/1981 | Webster | 137/559 |
| 4,858,883 A | 8/1989 | Webster | 251/61.1 |
| 5,217,797 A * | 6/1993 | Knox et al. | 428/167 |
| 5,259,737 A * | 11/1993 | Kamisuki et al. | 347/1 |
| 5,304,487 A | 4/1994 | Wilding et al. | 435/291 |
| 5,376,252 A | 12/1994 | Ekström et al. | 204/299 R |
| 5,453,163 A | 9/1995 | Yan | 204/180.1 |
| 5,567,287 A * | 10/1996 | Joshi et al. | 204/265 |
| 5,573,651 A | 11/1996 | Dasgupta et al. | 204/601 |
| 5,593,564 A | 1/1997 | Templin et al. | 204/451 |
| 5,646,048 A | 7/1997 | Templin et al. | 436/180 |
| 5,660,370 A | 8/1997 | Webster | 251/129.17 |
| 5,725,363 A * | 3/1998 | Bustgens et al. | 417/207 |
| 5,726,404 A | 3/1998 | Brody | 200/81 R |
| 5,779,868 A | 7/1998 | Parce et al. | 204/664 |
| 5,785,831 A | 7/1998 | Bek | 204/451 |
| 5,800,690 A | 9/1998 | Chow et al. | 204/451 |
| 5,842,787 A | 12/1998 | Kopf-Sill et al. | 366/340 |
| 5,858,195 A | 1/1999 | Ramsey | 204/601 |
| 5,876,675 A | 3/1999 | Kennedy | 422/99 |
| 5,879,632 A | 3/1999 | Demers | 422/100 |
| 6,007,309 A * | 12/1999 | Hartley | 417/322 |
| 6,033,544 A * | 3/2000 | Demers et al. | 204/450 |
| 6,042,704 A * | 3/2000 | Joshi et al. | 204/265 |
| 6,106,245 A * | 8/2000 | Cabuz | 417/322 |
| 6,116,863 A * | 9/2000 | Ahn et al. | 417/322 |
| 6,277,257 B1 * | 8/2001 | Paul et al. | 204/450 |

FOREIGN PATENT DOCUMENTS

WO      9721090      6/1997

OTHER PUBLICATIONS

"The Electric Double Layer and Electrokinetic Phenomena," Solutions of Electrolytes, pp. 190–202.
Paul, Phillip H. et al., Sandia National Laboratories, "Electrokinetic Generation of High Pressures Using Porous Microstructures.".

* cited by examiner

Primary Examiner—Jill Warden
Assistant Examiner—Jennine M Brown
(74) Attorney, Agent, or Firm—Thompson Hine LLP

(57) ABSTRACT

In one embodiment, a fluidic module, such as a microfluidic module, has a fluid-flow channel, an electroosmotic flow membrane positioned in the channel, and a cathode located on one side and an anode located on the other side of the membrane so that an electrolyte in the channel is transported through the membrane in the presence of a voltage. In another embodiment, the channel has a port, a flexible and fluid-impermeable diaphragm is added, the electrolyte is contained in a reservoir, and the membrane moves the bladder which acts as a valve for fluid leaving the channel through the port. In a further embodiment, electrolyte in a first reservoir is transported through the membrane to move the bladder to force fluid out of a second reservoir.

20 Claims, 4 Drawing Sheets

ELECTROOSMOTIC FLOW CONTROLLED MICROFLUIDIC DEVICES

CROSS-REFERENCE TO RELATED APPLICATION

The present application claims priority from U.S. Provisional Application No. 60/136,886, filed Jun. 1, 1999, the entire disclosure of which is incorporated herein by reference.

BACKGROUND OF THE INVENTION

The present invention relates to a valving mechanism for microfluidic devices and more particularly to a valving mechanism which is controlled or actuated by electroosmotic flow (EOF). The invention also relates to a device for delivering fluid reagents which is actuated by EOF.

One example of a valving mechanism for a microfluidic device is described in U.S. Pat. Nos. 4,304,257; 4,858,883 and 5,660,370 to Webster and others. That mechanism employs a flexible sheet or diaphragm which is moved toward or away from a flat non-flexing sheet member having a pair of fluid ports such that flow between the ports is easily regulated. In one embodiment disclosed in U.S. Pat. No. 5,660,370, the diaphragm is attached to the plunger head of a solenoid which is operated to move the diaphragm between blocking and non-blocking positions to activate the valve. In another embodiment disclosed in U.S. Pat. No. 4,858,883, the diaphragm overlies a concavity which is connected to a source of vacuum or pressure which controls the valve. Other microvalve constructions useful in microfluidic devises are described in International Application WO 97/21090. These constructions include a piezoelectric element in which an applied voltage is used to deform the element and block fluid flow; a diaphragm which includes a bimetallic element which is resistively heated to proportionately deflect the diaphragm; an electrostatically activated plunger which is moved into a gap in the microfluidic; and a single-use valve fashioned from polymers which are stretched under defined condition such that when the polymer is subsequently heated, the polymer chains relax and thereby actuate the valve.

SUMMARY OF THE INVENTION

Electroosmotic flow (EOF) has been proposed as a means for moving solutions within a microfluidic device. In accordance with the present invention, two valve constructions are proposed for valves which utilize EOF to control the flow of a fluid between two ports. In one embodiment EOF is used to generate sufficient pressure to actuate a diaphragm valve. In another embodiment, EOF is used to control flow through a membrane which functions as a gate which is opened and closed electrokinetically. Another manifestation of the invention is a fluid delivery device in which EOF is used to move a diaphragm into a reservoir containing a reagent and in turn to meter the reagent into a microfluidic device.

DETAILED DESCRIPTION OF THE INVENTION

Figure 1:
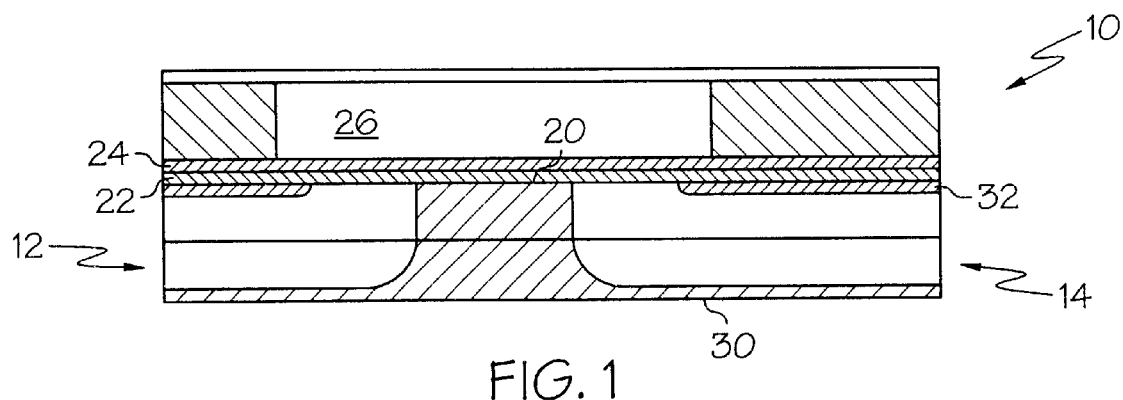
FIG. 1 schematically illustrates a valve construction in the passive state in accordance with one manifestation of the present invention.

P. H. Paul, D. W. Arnold, D. J. Rakestraw, Electrokinetic Generation of High Pressures Using Porous Microstructures, Proceedings of the $\mu$TAS'98 Workshop Banff, Canada, 13–16 October 1998 p.49 reports that up to 8,000 psi pressure can be generated electrokinetically through a porous media and shows that there is a log-linear relationship between pressure per volt and bead diameter and a linear relationship between pressure and applied voltage. In accordance with the present invention these electrokinetic pressures are used to operate a diaphragm valve. A microfluidic device is provided which includes a valve body having first and second fluid passageways which intersect the surface of the valve body at spaced locations and a valve diaphragm having a surface for making engagement with said valve body surface. A porous membrane is provided between a pair of electrodes and is operatively associated with the diaphragm member and a reservoir of an electrolyte such that when a voltage is applied between the electrodes, the electrolyte is transported through the membrane to effect a change in pressure between the diaphragm and the membrane. The change in pressure actuates the valve. In one embodiment of the invention the EOF of the electrolyte results in application of a positive pressure which closes the valve. In another embodiment the applied voltage causes the electrolyte to move away from the diaphragm and thereby opens the valve.

The valve body and diaphragm can be constructed from materials and using manufacturing techniques that have previously been used in the construction of microfluidic devices with the addition of an EOF membrane and electrodes as described herein. The channel size in the microfluidic devices of the present invention can range from about 50 to 500 microns.

The EOF membrane can be one having an open porous network in which the pore size may range from about 30 angstroms to about 25 microns. The membrane may be about 2 microns to about 25 microns thick and is more typically about 2 to 12 microns thick. The pore size and thickness of the membrane are selected such that an EOF adequate to operate the valve can be established without using voltages which cause electrolysis. Water electrolyzes at about 1.2 to 1.5 volts depending on the electrode. However, by selecting an electrode with a high overpotential (e.g., a boron doped diamond electrode), voltages as high as about 2 volts can be used without electrolysis.

The EOF velocity is usually very small, e.g., about 0.0001 m/sec and is a function of the membrane, the fluid and the voltage. Accordingly, the valve is designed and structured such that the small EOF velocities generate pressures sufficient to operate the valve, e.g., about 10 to 30 psi in conventional microfluidic devices. The valves will not actuate immediately but rather upon application of the electric field, the field will force electrolyte to flow through the membrane. The valve will open or close (depending on the valve design) when sufficient fluid has been pumped through the membrane to generate enough pressure to actuate the valve.

The EOF membrane will be formed by a material which can carry a charge upon the inner surfaces of the walls of its pores such that when it is placed in and ionic solution it will create an electric double layer which is characteristic of electroosmotic. Most substances will acquire a surface electric charge when brought into contact with an aqueous medium via a charging mechanism such as ionization, ion adsorption, or ion dissolution. Additionally, the membrane must be inert to the fluids with which the microfluidic is used and is desirable a material that can be readily bonded to the valve body. Preferably the membrane will be bonded within the microfluidic device using an adhesive or a bonding technique such as heat sealing, but mechanical constructions using clips and other fasteners could also be used for some applications. Two materials which are commercially available and have been used experimentally are track etched polycarbonate and track etched polyimide. If the membrane is so thin that it is not able to maintain enough pressure to actuate the valve, e.g., the membrane flexes readily under pressures less than 20 psi, a contiguous structural supporting material such as cellulosic or synthetic paper, a metal or synthetic wire mesh may be used in conjunction with the membrane to prevent the membrane from yielding to the EOF pressure.

In order to generate the EOF, an electric field is deployed across the membrane. Typically this field can run from about 100 v/cm to 1000 v/cm but those skilled in the art will recognize that the field controls the EOF velocity and weaker fields could be used but the valve will operate more slowly and stronger fields could be used provided that they do not result in electrolysis. As explained above, due to the electrolytic limits of water, the electric field generally must be effected using less than 2 volts. This field is most conveniently established using thin film electrodes of a type known in the art. An electrode is preferably selected which does not result in dendrite formation or the formation of precipitates and which does not produce appreciable gas through electrolysis. Silver or platinum electrodes are well known and can be used but other electrodes having a higher overpotential which can be sputter deposited may prove to be more desirable for use.

Figure 2:
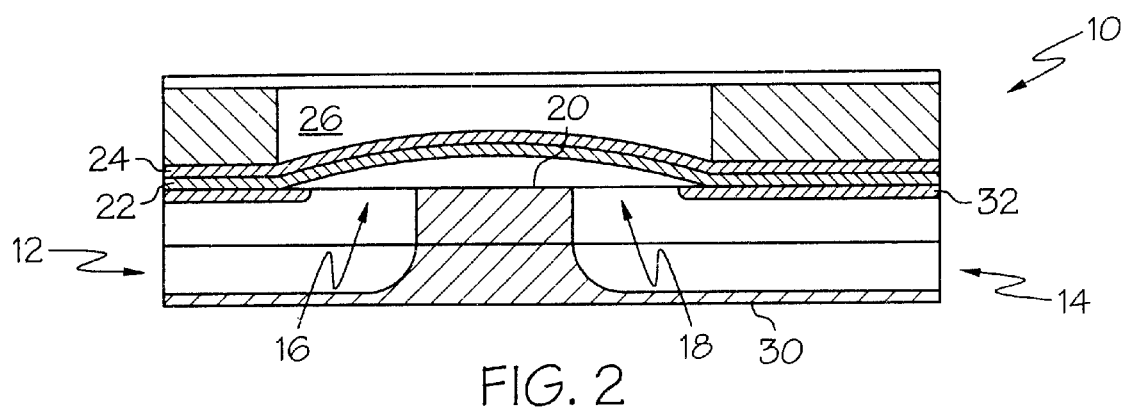
FIG. 2 schematically illustrates a valve construction in the de-energized state in accordance with one manifestation of the present invention.
Figure 3:
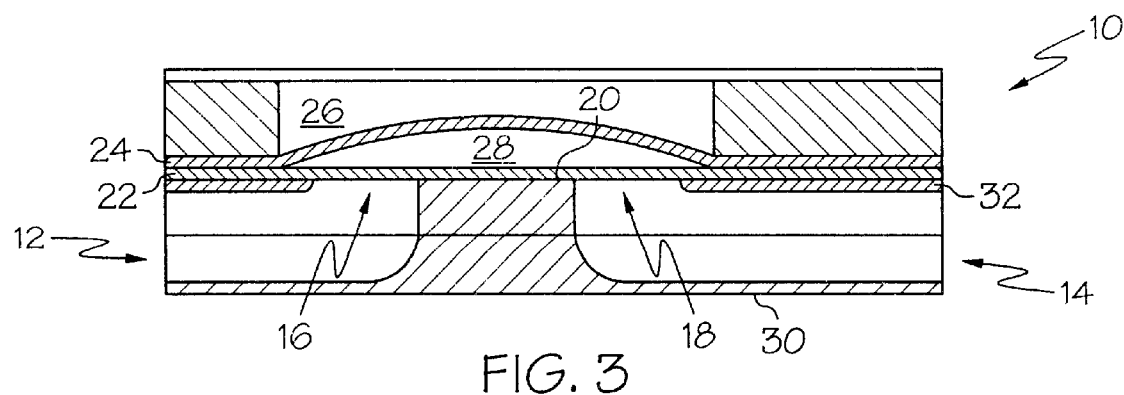
FIG. 3 schematicaly illustrates a valve construction in the energized state in accordance with one manifestation of the present invention.

FIGS. 1–3 schematically illustrate one embodiment of the invention wherein a microfluidic device 10 contains a first channel 12 and a second channel 14 having respectively ports 16 and 18 which open on a valve area 20 on one surface of the microfluidic 10. The microfluidic is constructed from interfacing lower element 30 and upper element 32 which have been micromachined at the interface to provide the channels 12 and 14. A diaphragm 22 overlies the ports 16 and 18. The diaphragm 22 is a fluid impermeable but flexible partition such as a polyimide or a polyurethane film. Juxtaposed with the diaphragm is the EOF membrane 24. This EOF membrane seals a reservoir 26 containing an electrolyte. In FIG. 1, the valve is shown in a passive state in which no fluid is flowing in the microfluidic. When a fluid is pumped through the microfluidic as shown in FIG. 2, the fluid easily deflects the diaphragm/EOF membrane construction 22/24 and passes between the first and second channels 12 and 14 through the ports 16 and 18. The microfluidic includes a pair of electrodes which is not shown in FIGS. 1–3. In the illustrated in FIG. 3 when an electric field is applied by means of the electrodes, the electrolyte in reservoir 26 is transported through the EOF membrane 24 and because the diaphragm is impermeable, the electrolyte accumulates in the space 28 between the diaphragm and the membrane and produces a positive pressure on the fluid impermeable diaphragm 22 forcing it to seal the ports 16 and 18. To open the valve, the electric field can be reversed such that electrolyte is transported back into the reservoir 26 so that fluid pressure in channels 12 and 14 moves the diaphragm away from the ports 16 and 18.

Figure 4:
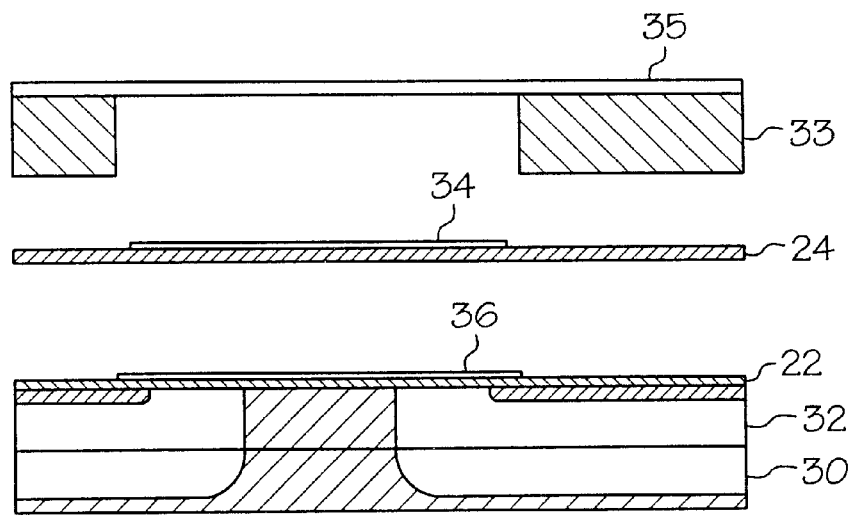
FIG. 4 is an exploded view of a valve construction in accordance with one embodiment of the invention in which the electrodes have the design shown.

FIG. 4 is an exploded view of a valve construction in accordance with this embodiment of the invention showing that the reservoir is formed from a electrolyte containment layer 33 which may be formed from the same material as the microfluidic halves 30 and 32 or from a different dimensionally stable and inert material, and a flexible containment layer 35 which is conveniently formed of a material such as a polyester or polyimide film. The containment layer 35 is preferably sufficiently flexible so that a negative pressure which interferes with electroosmotic flow is not produced in the electrolyte chamber as the electrolyte moves from the reservoir 26 into the space 28. In lieu of a flexible containment layer, the reservoir could be vented.

The EOF membrane 24 is sandwiched between a pair of thin film electrodes. These electrodes are formed from materials and in a manner that is well known in the art. In the illustrated embodiment, one electrode 34 is located on the side of the EOF membrane 24 which faces the reservoir and the other electrode 36 is affixed to the diaphragm 22. The electrodes can be shaped as shown in top view in FIG. 5 in which one is annular (electrode 34) and the other 36 is a disk or they can be shaped differently provided that they generate an electric field across the EOF membrane which transports fluid. The electrodes will include tabs 38 for connecting them to an external power supply. The electrolyte is preferably an aqueous solution of a monovalent salt such as sodium borate. Typically a concentration less than about 0.1 $\mu$M to 1.0 mM is used.

The microfluidic halves, the diaphragm, the EOF membrane and the reservoir can be assembled using one or a combination of techniques known in the art including using adhesives, self bonding films, melt flow or mechanical clamping.

Figure 5:
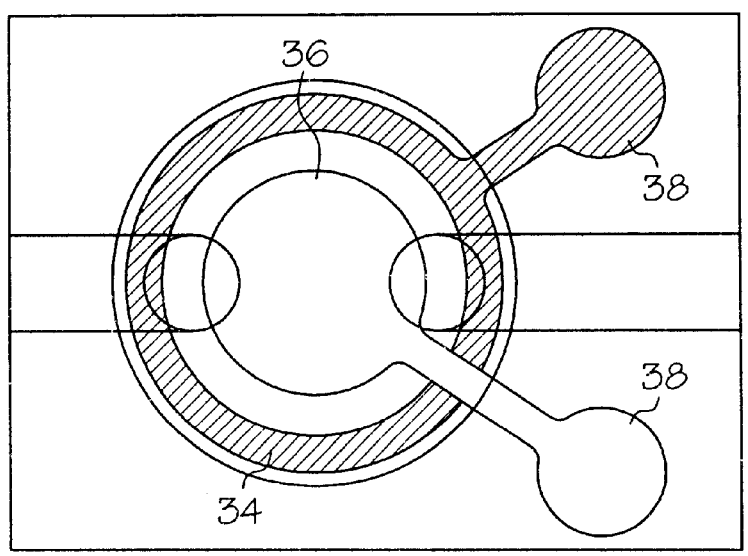
FIG. 5 is an overhead view of a valve construction in which the electrodes have the design shown in accordance with one embodiment of the invention.
Figure 6:
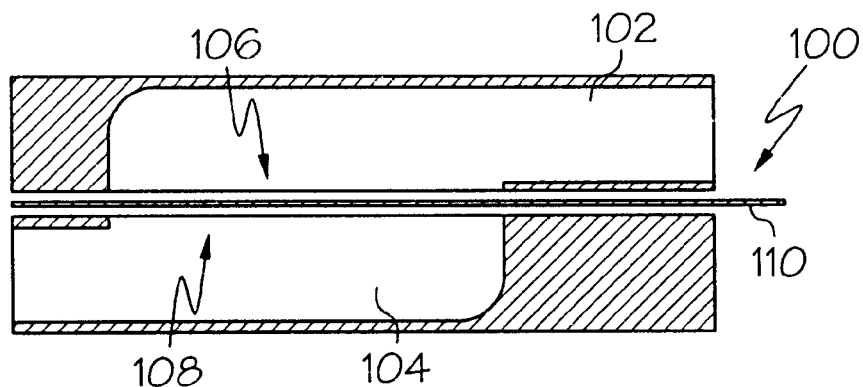
FIG. 6 is a schematic illustration of a valve construction in accordance with another embodiment of the invention in which the EOF membrane controls the flow of fluid through a microfluidic device
Figure 7:
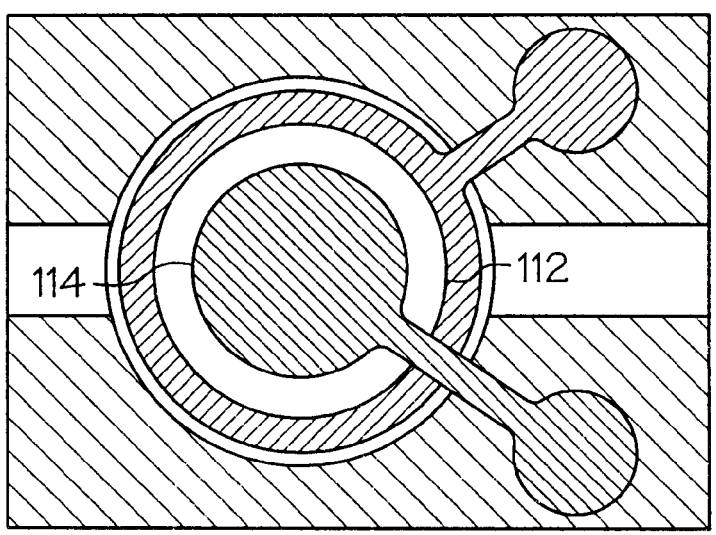
FIG. 7 is an overhead view of a valve construction in which the electrodes have the design shown in accordance with another embodiment of the invention.

In another embodiment of the invention as schematically illustrated in FIG. 6, the diaphragm is omitted and the EOF membrane is interposed in the channel as a "gate" that is opened, partially opened or closed using the electric field strength. For this embodiment of the invention, the fluid passing through the microfluidic must have a weakly ionic character. In this embodiment of the invention a microfluidic device 100 includes a first channel 102 and a second channel 104 which open onto each other at common ports 106 and 108. Interposed between these ports is an EOF membrane 110 which includes electrodes 114 and 112 (FIG. 7) on each side thereof. The electrodes can have the same construction as shown in FIG. 5. When the electric field is zero or very low, essentially no fluid passes through the membrane. When an electric field is applied, the EOF membrane 110 transports fluid across the membrane and enables flow between the channels 102 and 104. In theory, by varying the field strength one should be able to control the rate of flow through the membrane.

Figure 8A:
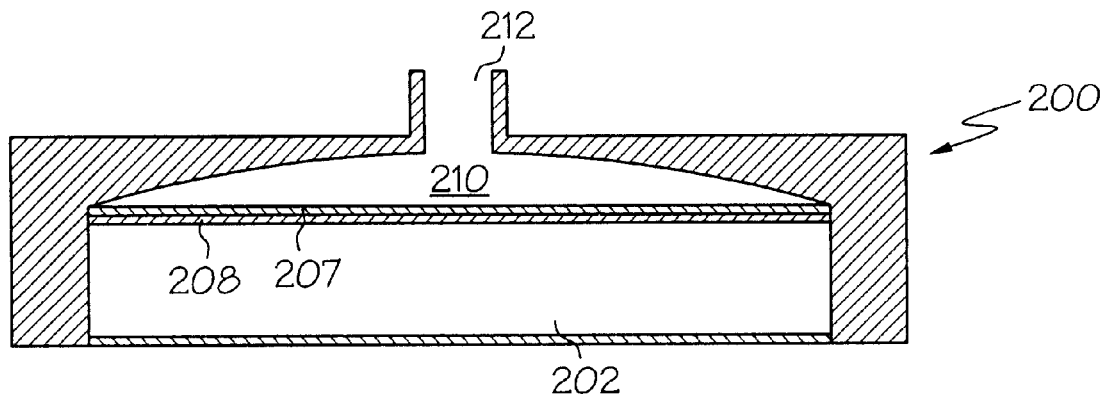
FIG. 8 is a schematic illustration in which the EOF membrane is used in a fluid delivery device for metering fluid from a reservoir to a microfluidic or other device.
Figure 8B:
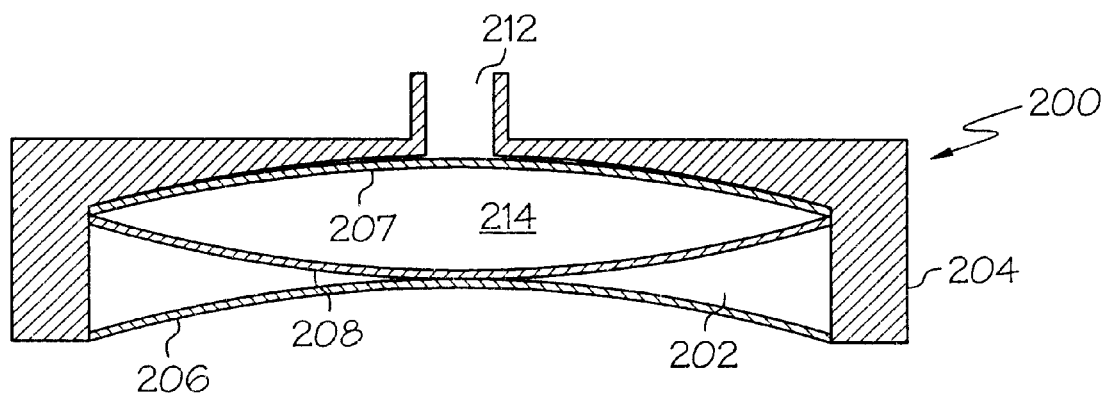

In another embodiment of the invention an EOF membrane is used as an actuator for a fluid delivery system. This embodiment is illustrated in FIG. 8. The dispenser 200 includes a reservoir of electrolyte 202, which is formed by a containment layer 204 and a pair of flexible bladder diaphragms 206/207. An EOF membrane 208 is provided inside the electrolyte reservoir 202 on the electrolyte reservoir side of the bladder diaphragm 207. A second reservoir 210 contains a solution, such as a solution of a reagent, that is to be delivered. This reservoir includes a small outlet 212 which may feed a microfluidic or a reagent delivery device. As in the other embodiments of the invention, the EOF membrane 208 is used in conjunction with a pair of electrodes analogous to FIGS. 5 and 7. By applying a voltage across the anode and cathode, the electrolyte is transported from the reservoir 202 across the EOF membrane 208 into the space 214 between the EOF membrane 208 and the bladder diaphragm 207. This results in a fluid pressure being applied to the diaphragm 207 which causes the diaphragm to expand into the reservoir 210 thereby forcing the fluid from the reservoir via the outlet 212. At the same time, the bladder 206 and the EOF membrane 208 are drawn together as shown in FIG. 8(b). While the embodiment of FIG. 8 shows the electrolyte chamber being formed from two flexible bladder members, this is not an essential element of the invention. The electrolyte chamber could be formed using a single flexible bladder or the electrolyte chamber could be vented so that a negative pressure which would interfere with the EOF flow is not created in the electrolyte chamber as the electrolyte is transported.

In summary, one manifestation of the invention is a microfluidic module having fluid flow channels therein, at least one fluid flow channel being in communication with a diaphragm valve, said diaphragm valve including a flexible fluid impermeable diaphragm and a fluid permeable member contiguous with said fluid impermeable diaphragm, a reservoir of an electrolyte in fluid communication with said fluid permeable member, a cathode positioned on one side of said fluid permeable member and an anode positioned on the opposite side of said fluid permeable member such that when a voltage is applied to said electrodes, said electrolyte is transported through said fluid permeable member and said transported electrolyte applies fluid pressure to said diaphragm thereby closing said valve.

In a more particular manifestation of the invention, the fluid permeable member is a porous membrane which is interposed between said fluid impermeable diaphragm and said reservoir such that when a voltage is applied between said electrodes, electrolyte is transported from said reservoir to said diaphragm where fluid pressure is applied to close said valve.

Another manifestation of the invention is a module having fluid flow channels therein, at least one fluid flow channel having a fluid permeable membrane situated therein such that fluid passing through said channel must flow through said membrane, said membrane having a cathode on one side thereof and an anode on the other side such that when a voltage is applied to said electrodes, fluid flows selectively through said channel and when no voltage is applied to said electrodes, essentially no fluid flows through said channel whereby the flow of fluid through said channel is controlled electrokinetically by said membrane.

Still another manifestation of the invention is a fluid delivery system which includes a first reservoir of an electrolyte, a second reservoir of a fluid to be delivered by said delivery system, an outlet in said second reservoir, a flexible fluid impermeable diaphragm and a fluid permeable diaphragm interposed between said first and second reservoirs, said fluid permeable diaphragm having electrodes positioned on each side thereof wherein by applying a voltage to said electrodes, said electrolyte is transported from said first reservoir through said membrane and said electrolyte expands said fluid impermeable membrane into said second reservoir containing said deliverable fluid thereby forcing said fluid through the outlet in said second reservoir.

What is claimed is:
1. A fluidic module comprising:
 a) a fluid-flow channel having a port;
 b) a diaphragm valve having:
  (1) a flexible and fluid-impermeable diaphragm disposed in fluid communication with said port; and
  (2) an electroosmotic-flow membrane having two sides and disposed contiguous with said diaphragm;
 c) a reservoir containing an electrolyte in fluid communication with said membrane;
 d) a cathode disposed on one of said two sides of said membrane; and
 e) an anode disposed on the other of said two sides of said membrane such that, when a voltage is applied across said anode and said cathode, said electrolyte is transported through said membrane applying fluid pressure against said diaphragm flexibly moving said diaphragm relative to said port of said channel.

2. The fluidic module of claim 1, wherein said diaphragm flexibly moves against said port closing said valve when said voltage is applied across said anode and said cathode.

3. The fluidic module of claim 1, also including a pressurized fluid in said channel.

4. The fluidic module of claim 3, wherein said diaphragm flexibly moves against said port closing said valve from said pressurized fluid when said voltage is applied across said anode and said cathode.

5. The fluidic module of claim 4, wherein said pressurized fluid opens said valve when said voltage is reversed in sign and applied across said anode and said cathode.

6. A fluidic module comprising:
 a) a first fluid-flow channel having a port;
 b) a second fluid-flow channel having a port;
 c) a surface area separating said ports of said first and second fluid-flow channels;
 d) a diaphragm valve having:
  (1) a flexible and fluid-impermeable diaphragm overlying said surface area and said ports of said first and second fluid-flow channels; and
  (2) an electroosmotic-flow membrane having two sides and disposed contiguous with and overlying said diaphragm;
 c) a reservoir containing an electrolyte in fluid communication with said membrane;
 d) a cathode disposed on one of said two sides of said membrane; and
 e) an anode disposed on the other of said two sides of said membrane such that, when a voltage is applied across said anode and said cathode, said electrolyte is transported through said membrane applying fluid pressure against said diaphragm flexibly moving said diaphragm against said surface area and said ports of said first and second fluid-flow channels closing said valve.

7. The fluidic module of claim 6, wherein said first and second fluid-flow channels each have a channel size of between about 50 microns and generally 500 microns.

8. The fluidic module of claim 6, wherein said membrane has a network of open pores each having a pore size of between about 30 angstroms and about 25 microns.

9. The fluidic module of claim 6, wherein said membrane has a thickness of between generally 2 microns and about 24 microns.

10. The fluidic module of claim 6, where electrolyte comprises water and wherein said effective voltage is less than about 2 volts.

11. A fluidic module comprising:
   a) a fluid-flow channel;
   b) an electroosmotic-flow membrane having two sides and disposed in said channel such that any fluid flow in said channel must pass through said membrane;
   c) a cathode disposed on one of said two sides of said membrane; and
   e) an anode disposed on the other of said two sides of said membrane such that, when said channel contains an electrolyte and a voltage is applied across said anode and said cathode, said electrolyte is transported through said membrane and, in the absence of said voltage, essentially none of said electrolyte is transported through said membrane.

12. The fluidic module of claim 11, wherein said channel contains an electrolyte and wherein, when said voltage is applied across said anode and said cathode, said electrolyte is transported through said membrane at a velocity which is dependent on the absolute value of said voltage.

13. The fluidic module of claim 11, wherein said first and second fluid-flow channels each have a channel size of between generally 50 microns and about 500 microns.

14. The fluidic module of claim 11, wherein said membrane has a network of open pores each having a pore size of between about 30 angstroms and about 25 microns.

15. The fluidic module of claim 11, wherein said membrane has a thickness of between about 2 microns and about 25 microns.

16. A fluid delivery system comprising:
   a) a first reservoir containing an electrolyte;
   b) a second reservoir having an outlet;
   c) a flexible and fluid-impermeable diaphragm separating said first reservoir from said second reservoir;
   d) an electroosmotic-flow membrane having two sides and disposed contiguous with said diaphragm and in fluid communication with said electrolyte;
   e) a cathode disposed on one of said two sides of said membrane; and
   f) an anode disposed on the other of said two sides of said membrane such that, when a fluid is disposed in said second reservoir and a voltage is applied across said anode and said cathode, said electrolyte is transported through said flow membrane applying fluid pressure against said diaphragm flexibly moving said diaphragm relative to said outlet forcing said fluid through said outlet of said second reservoir.

17. The fluid delivery system of claim 16, wherein said outlet has an outlet size of between about 50 microns and generally 500 microns.

18. The fluidic module of claim 16, wherein said membrane has a network of open pores each having a pore size of between about 30 angstroms and about 25 microns.

19. The fluidic module of claim 16, wherein said membrane has a thickness of between about 2 microns and about 25 microns.

20. The fluidic module of claim 16, wherein said effective voltage is less than about 2 volts.

* * * * *

UNITED STATES PATENT AND TRADEMARK OFFICE
CERTIFICATE OF CORRECTION

PATENT NO. : 6,406,605 B1
DATED : June 18, 2002
INVENTOR(S) : Donald R. Moles

It is certified that error appears in the above-identified patent and that said Letters Patent is hereby corrected as shown below:

<u>Column 7,</u>
Line 2, the word "generally" should be -- about --; and change "24" to -- 25 --.
Line 15, the wording "the absolute value of said voltage" should be -- the effective voltage --
Line 29, the word "generally" should be -- about --

Signed and Sealed this

Fifteenth Day of October, 2002

*Attest:*

*Attesting Officer*

JAMES E. ROGAN
*Director of the United States Patent and Trademark Office*